(12) United States Patent
Akaiwa

(10) Patent No.: US 8,395,563 B2
(45) Date of Patent: *Mar. 12, 2013

(54) METHOD AND ADJUSTING DEVICE FOR PROJECTION-TYPE DISPLAY

(75) Inventor: Shoichi Akaiwa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 152 days.

This patent is subject to a terminal disclaimer.

(21) Appl. No.: 13/102,804

(22) Filed: May 6, 2011

(65) Prior Publication Data

US 2011/0209060 A1 Aug. 25, 2011

Related U.S. Application Data

(63) Continuation of application No. 11/808,333, filed on Jun. 8, 2007, which is a continuation of application No. 09/508,640, filed as application No. PCT/JP99/03606 on Jul. 2, 1999, now Pat. No. 7,265,765.

(30) Foreign Application Priority Data

Jul. 15, 1998 (JP) .................................... 10-201007

(51) Int. Cl.
*G09G 1/06* (2006.01)
(52) U.S. Cl. ............ 345/10; 345/11; 715/705; 715/709; 715/722
(58) Field of Classification Search .................... 345/10, 345/11, 101; 715/705, 709, 722, 708; 348/177
See application file for complete search history.

(56) References Cited

U.S. PATENT DOCUMENTS

| | | |
|---|---|---|
| 4,514,764 A | 4/1985 | Borg et al. |
| 4,951,235 A | 8/1990 | Mori |
| 5,086,385 A | 2/1992 | Launey et al. |
| 5,136,397 A | 8/1992 | Miyashita |
| 5,241,655 A | 8/1993 | Mineki et al. |
| 5,602,625 A | 2/1997 | Okamoto et al. |
| 5,650,827 A | 7/1997 | Tsumori et al. |
| 5,703,657 A | 12/1997 | Maruoka et al. |
| 5,761,610 A | 6/1998 | Sorensen et al. |
| 5,794,142 A | 8/1998 | Vanttila et al. |
| RE36,060 E | 1/1999 | Miyashita |
| 6,009,234 A | 12/1999 | Taira et al. |
| 6,100,886 A | 8/2000 | Lin |
| 6,279,824 B1 | 8/2001 | Park |
| 6,338,072 B1 | 1/2002 | Durand et al. |
| 6,452,607 B1 * | 9/2002 | Livingston ..................... 715/705 |
| 6,799,327 B1 | 9/2004 | Reynolds et al. |

(Continued)

FOREIGN PATENT DOCUMENTS

| | | |
|---|---|---|
| EP | 0 551 178 A2 | 7/1993 |
| EP | 0 772 355 A2 | 5/1997 |

(Continued)

OTHER PUBLICATIONS

Wikipedia article, "Component Video".

(Continued)

*Primary Examiner* — Chante Harrison
(74) *Attorney, Agent, or Firm* — Oliff & Berridge, PLC

(57) ABSTRACT

An image display device including an image input means to which image signals are input, an image display means for forming an optical image based on the image signals, and a device adjusting means for adjusting internal conditions of the device is provided with an adjusting operation support means for supporting an operation of the device adjusting means. Because the adjusting operation support means is provided, a user may easily adjust the image display device while confirming adjusting operation support information displayed by the adjusting operation support means.

10 Claims, 13 Drawing Sheets

U.S. PATENT DOCUMENTS

| | | | |
|---|---|---|---|
| 2002/0126140 A1* | 9/2002 | Gorbet et al. | 345/708 |
| 2002/0154153 A1 | 10/2002 | Messinger et al. | |

FOREIGN PATENT DOCUMENTS

| | | |
|---|---|---|
| EP | 0 844 788 A2 | 5/1998 |
| JP | A-02-287872 | 11/1990 |
| JP | A-03-145288 | 6/1991 |
| JP | A-04-166988 | 6/1992 |
| JP | A-5-11953 | 1/1993 |
| JP | A-05-075947 | 3/1993 |
| JP | A-05-093953 | 4/1993 |
| JP | A-05-130685 | 5/1993 |
| JP | A-05-161036 | 6/1993 |
| JP | A-05-183946 | 7/1993 |
| JP | A-05-183964 | 7/1993 |
| JP | A-06-125479 | 5/1994 |
| JP | A-07-111624 | 4/1995 |
| JP | A-07-123404 | 5/1995 |
| JP | A-08-065587 | 3/1996 |
| JP | A-8-123259 | 5/1996 |
| JP | A-08-245062 | 9/1996 |
| JP | A-08-331608 | 12/1996 |
| JP | A-08-340585 | 12/1996 |
| JP | A-09-055895 | 2/1997 |
| JP | A-09-130711 | 5/1997 |
| JP | A-10-039991 | 2/1998 |
| JP | A-11-191822 | 7/1999 |
| WO | WO 97/38560 | 10/1997 |

OTHER PUBLICATIONS

Wikipedia article, "Composite Video".
Kanzaki Web, "A Partial Guide to Broadcastings in Japan," Jul. 14, 1998.
FM World PC User's Guidebook with partial English translation (Jun. 1998).
FMV Series B3FH-4141-01 (1998) (with translation).
May 9, 2011 Notice of Allowance issued in U.S. Appl. No. 11/808,333.
Jan. 17, 2012 Office Action issued in Japanese Patent Application No. 2011-173144 (with English translation).
English translation of Nov. 29, 2011 Office Action issued in Japanese Patent Application No. 2009-212159.
English translation of Nov. 29, 2011 Office Action issued in Japanese Patent Application No. 2009-212160.

* cited by examiner

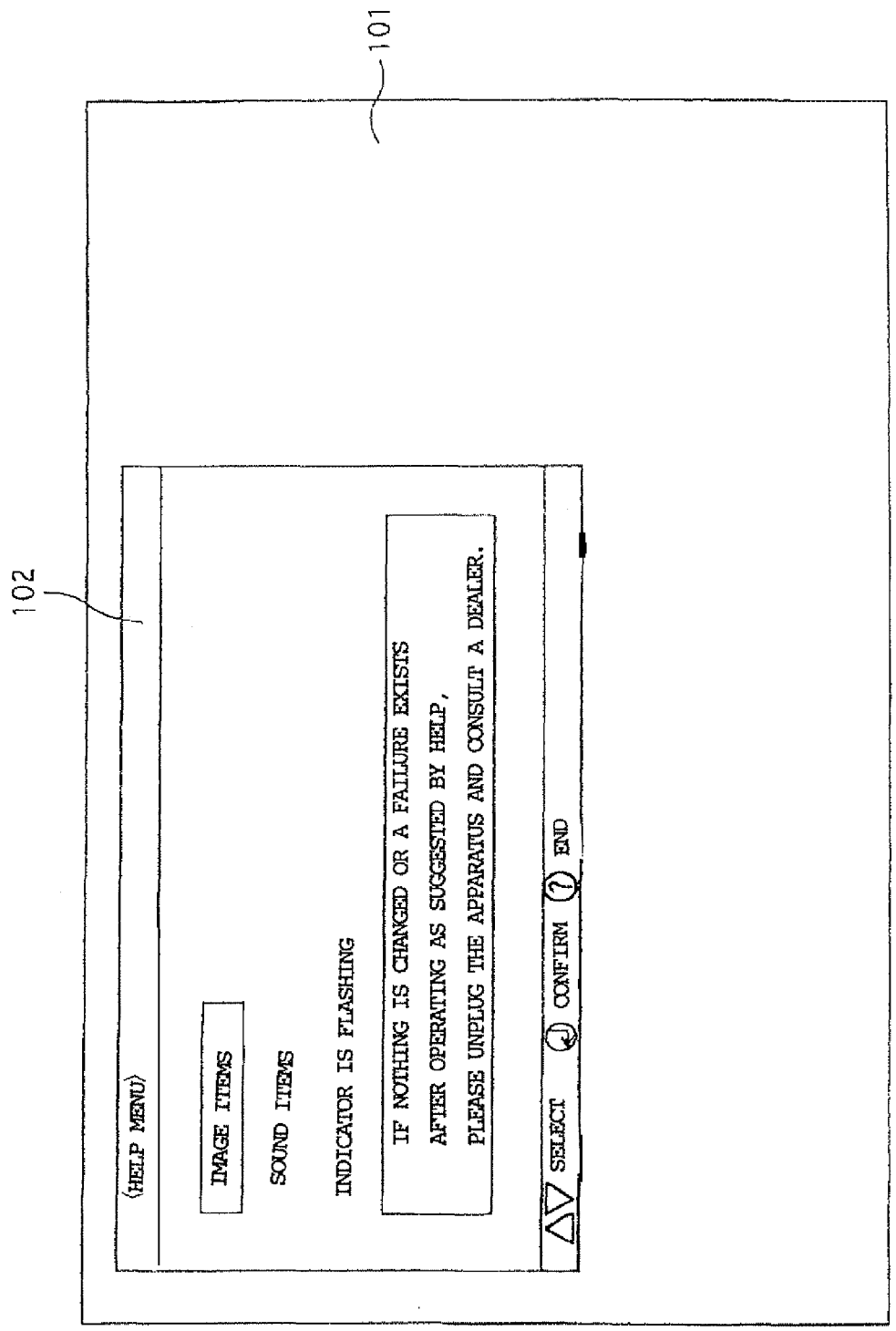

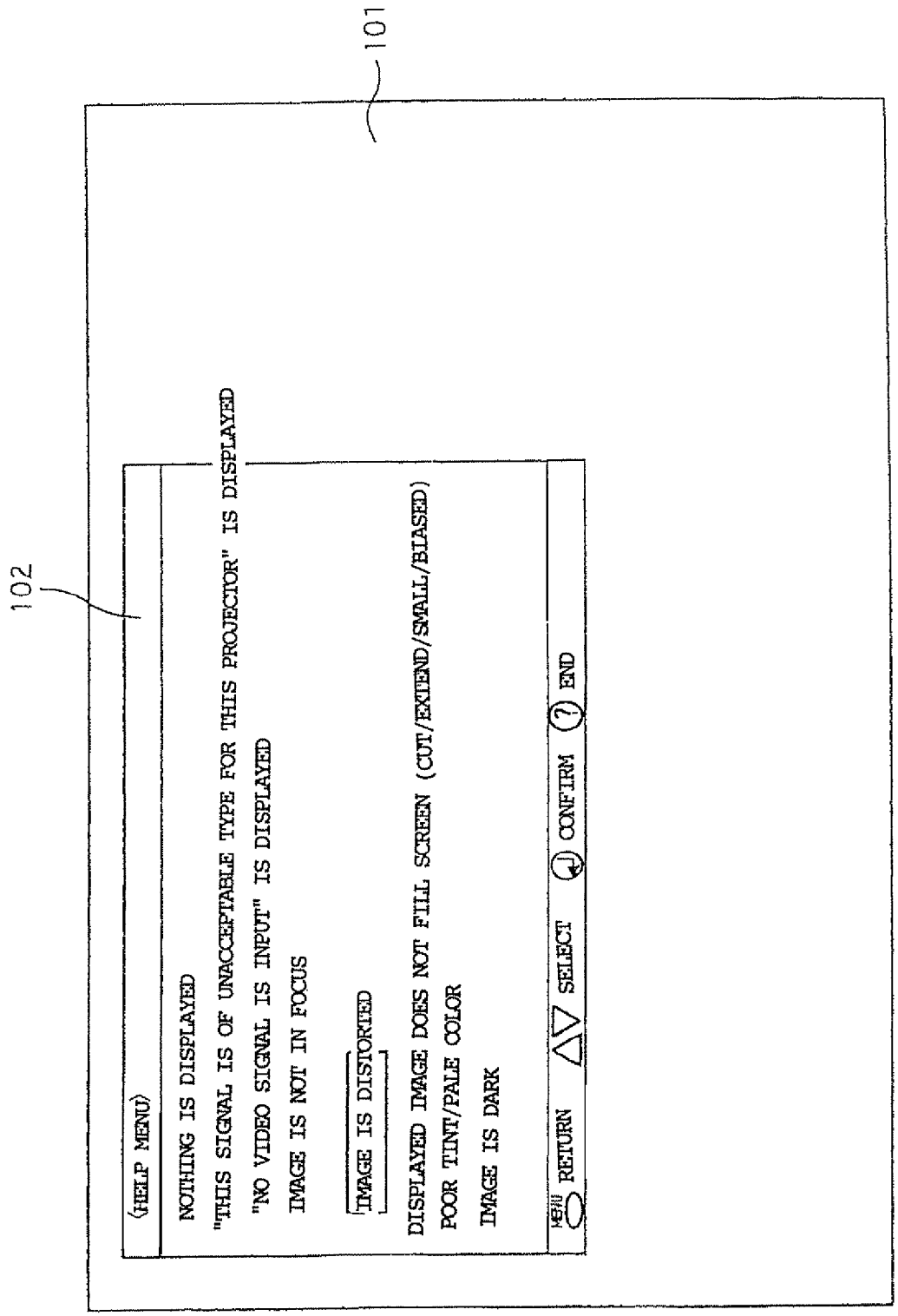

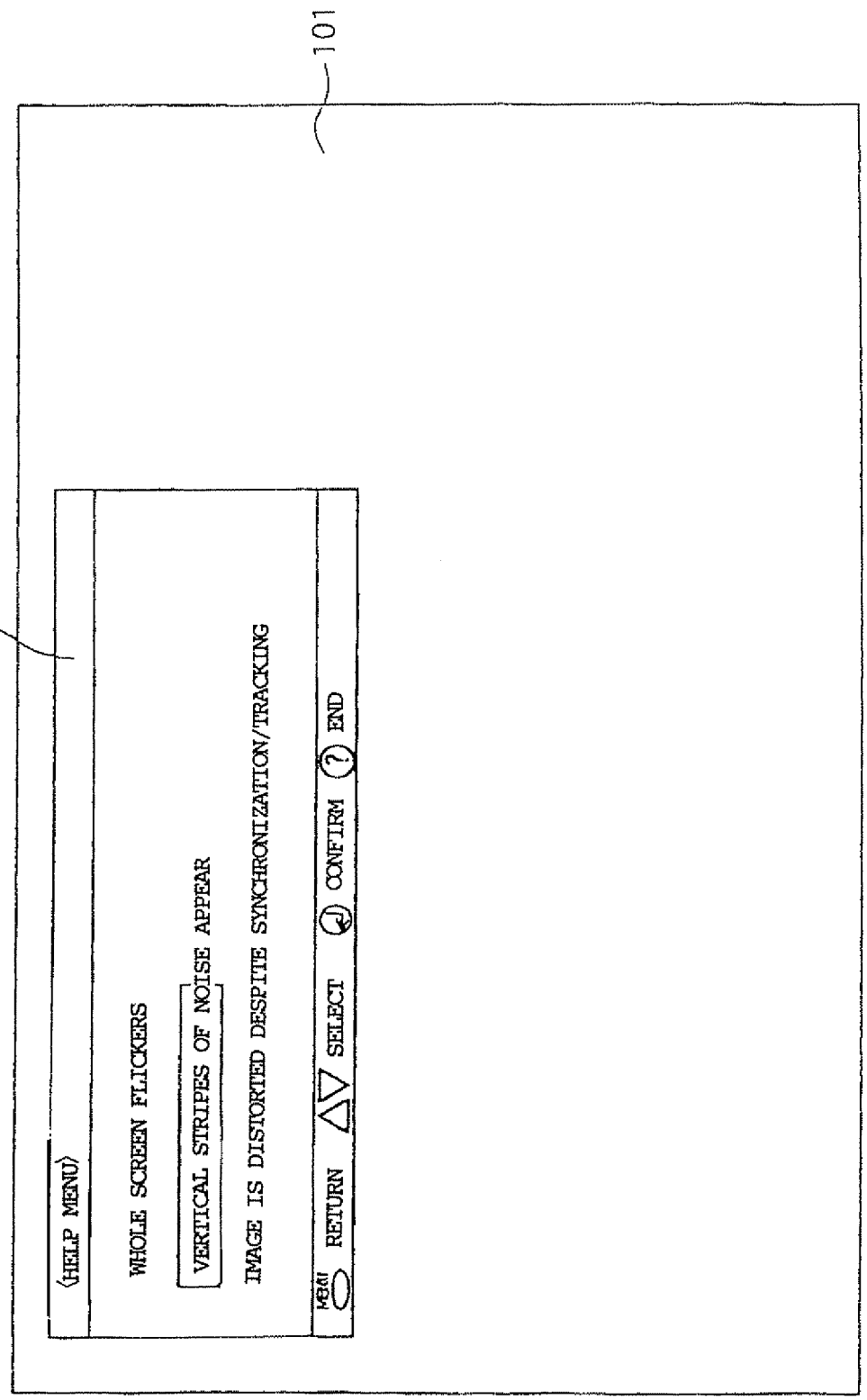

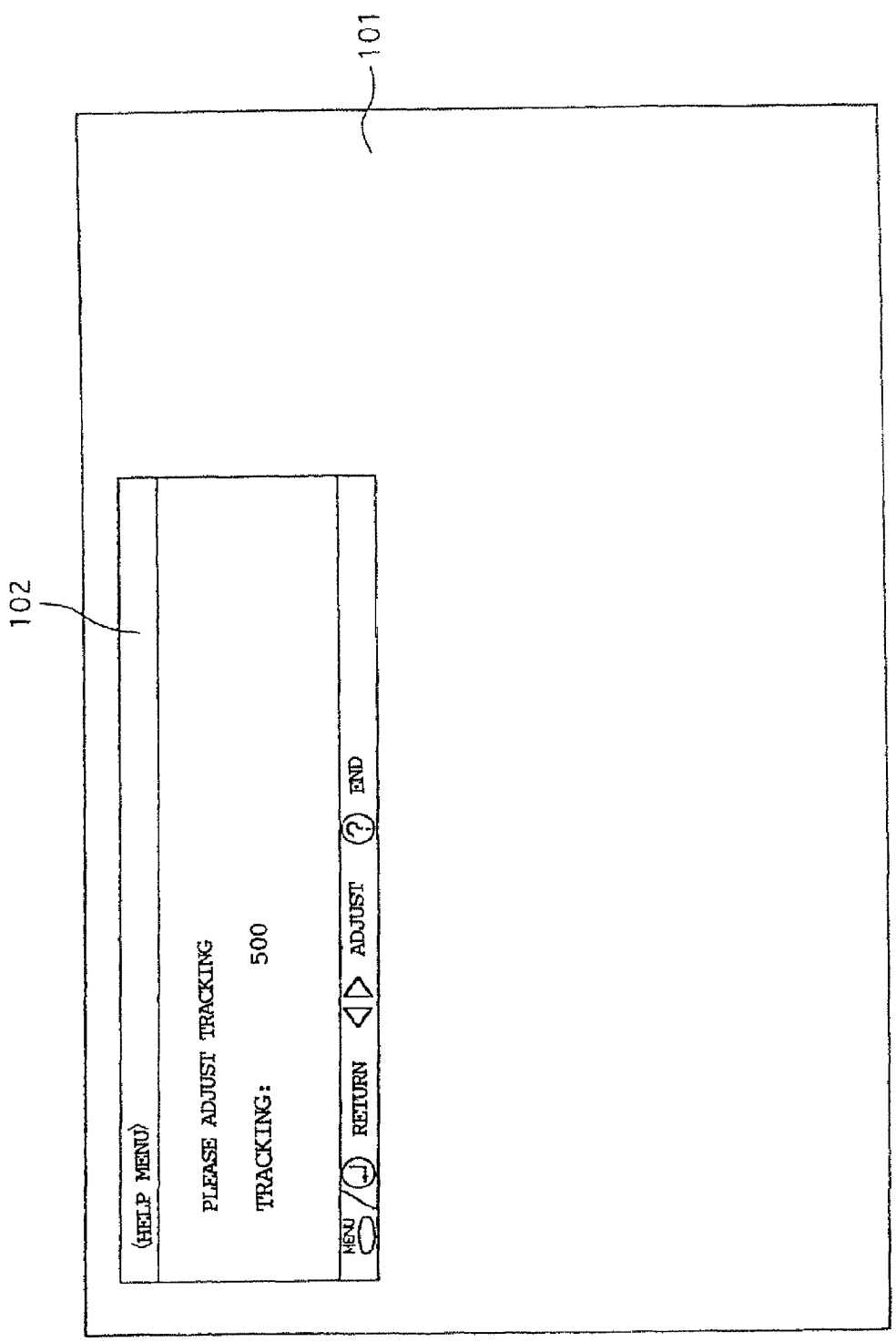

Fig. 9

| MAJOR CLASSIFICATION | INTERMEDIATE CLASSIFICATION | BRANCH CONDITIONS | MINOR CLASSIFICATION | ADJUSTMENT SUPPORT TO BE DISPLAYED |
|---|---|---|---|---|
| IMAGE ITEMS | | | | MESSAGE 1 |
| | NOTHING IS DISPLAYED | PC SOURCE SELECTED | | MESSAGE 2 |
| | | | | MESSAGE 3 |
| | | VIDEO SOURCE SELECTED | | MESSAGE 3 |
| | "THIS SIGNAL IS OF UNACCEPTABLE TYPE FOR THIS PROJECTOR" IS DISPLAYED | PC SOURCE SELECTED | | MESSAGE 4 |
| | | | | MESSAGE 5 |
| | | PC SOURCE SELECTED | | MESSAGE 6 |
| | | | | MESSAGE 7 |
| | | | | MESSAGE 8 |
| | "NO VIDEO SIGNAL IS INPUT" IS DISPLAYED | | | MESSAGE 9 |
| | | | | MESSAGE 10 |
| | | VIDEO SOURCE SELECTED | | MESSAGE 7 |
| | | | | MESSAGE 11 |
| | | | | MESSAGE 12 |
| | IMAGE IS NOT IN FOCUS | PC VIDEO SOURCE SELECTED | | MESSAGE 13 |
| | | | | MESSAGE 14 |
| | | | OVERALL SCREEN FLICKERS | MESSAGE 15 |
| | | PC SOURCE SELECTED | VERTICAL STRIPES OF NOISE APPEAR ON SCREEN | MESSAGE 16 |
| | IMAGE IS DISTORTED | | IMAGE IS DISTORTED DESPITE SYNCHNORIZATION AND TRACKING | MESSAGE 4 |
| | | VIDEO SOURCE SELECTED | | MESSAGE 17 |
| | | | | MESSAGE 18 |

FIG. 10

| MAJOR CLASSIFICATION | INTERMEDIATE CLASSIFICATION | BRANCH CONDITIONS | MINOR CLASSIFICATION | ADJUSTMENT SUPPORT TO BE DISPLAYED |
|---|---|---|---|---|
| IMAGE ITEMS | | | DOT PRESENTATION MODE | MESSAGE 19 |
| | | | E-ZOOM MODE | MESSAGE 20 |
| | | | ADJUST TRACKING | MESSAGE 16 |
| | DISPLAYED IMAGE DOES NOT FILL SCREEN (CUT/EXTEND/SMALL/BIASED, etc.) | PC SOURCE SELECTED | DISPLAYED IMAGE DOES NOT FILL SCREEN DESPITE TRACKING/DISPLAY POSITION ADJUSTMENT | MESSAGE 4 |
| | | | ADJUST DISPLAY POSITION | MESSAGE 21 |
| | | | DISPLAYED IMAGE DOES NOT FILL SCREEN DESPITE TRACKING/DISPLAY POSITION ADJUSTMENT | MESSAGE 4 |
| | POOR TINT/PALE COLOR | PC SOURCE SELECTED | | MESSAGE 22 |
| | | VIDEO SOURCE SELECTED | | MESSAGE 23 |
| | | LAMP LIFE WARNING INDIATED | | MESSAGE 24 |
| | IMAGE IS DARK | LAMP LIFE WARNING INDIATED | | MESSAGE 25 |
| | | | | MESSAGE 25 |
| | | PC VIDEO SOURCE SELECTED | | MESSAGE 26 |

FIG. 11

| MAJOR CLASSIFICATION | INTERMEDIATE CLASSIFICATION | BRANCH CONDITIONS | MINOR CLASSIFICATION | ADJUSTMENT SUPPORT TO BE DISPLAYED |
|---|---|---|---|---|
| SOUND ITEMS | NO SOUND | PC VIDEO SOURCE SELECTED | | MESSAGE 27 |
| | | PC SOURCE SELECTED | | MESSAGE 28 |
| | | VIDEO SOURCE SELECTED | | MESSAGE 29 |
| | | EXTERNAL TERMINAL CONNECTED | | MESSAGE 30 |
| | | VOLUME IS SET TO BE LOW | | MESSAGE 31 |

| MAJOR CLASSIFICATION | INTERMEDIATE CLASSIFICATION | BRANCH CONDITIONS | MINOR CLASSIFICATIONS | ADJUSTMENT SUPPORT TO BE DISPLAYED |
|---|---|---|---|---|
| INDICATOR FLASHES | | HIGH TEMPERATURE OPERATION | | MESSAGE 32 |
| | | LAMP LIFE WARNING INDICATED | | MESSAGE 25 |

FIG. 12

| NO. | CONTENT OF MESSAGE | ADJUSTMENT ITEM |
|---|---|---|
| 1 | ISN'T SCREEN SAVER OF COMPUTER ON? | |
| 2 | ISN'T COMPUTER BEING SUSPENDED? | |
| 3 | IS IMAGE BRIGHTNESS CORRECTLY ADJUSTED? | |
| 4 | PLEASE CHANGE SETTING OF RESOLUTION/REFRESH RATE OF COMPUTER (THIS MAY CHANGE NUMBER OF DISPLAYED COLORS OF COMPUTER.)<br>FOR Windows: CHANGE BY "SCREEN" ON CONTROL PANEL<br>FOR Macintosh: CHANGE BY "MONITOR" ON CONTROL PANEL | |
| 5 | IF YOU'RE USING NOTEBOOK-TYPE COMPUTER, IS IT SET TO OUTPUT IMAGE TO EXTERNAL DEVICE? | |
| 6 | IMAGE FROM COMPUTER IS CURRENTLY SELECTED.<br>FOR CHANGING TO IMAGE FROM VIDEO DEVICE, PUSH SOURCE BUTTON. | |
| 7 | IS CABLE CORRECTLY CONNECTED? | |
| 8 | IS CONNECTED COMPUTER TURNED ON? | |
| 9 | IS VIDEO SIGNAL OUTPUT FROM CONNECTED COMPUTER?<br>FOR NOTEBOOK-TYPE COMPUTER, VIDEO SIGNAL IS REQUIRED TO BE OUTPUT.<br>NORMALLY VIDEO SIGNAL IS OUTPUT TO LCD SCREEN, BUT NOT TO EXTERNAL DEVICE, SO PLEASE SWITCH TO EXTERNAL DEVICE.<br>(SIMULTANEOUSLY PUSH "Fn" KEY AND "F5" KEY)<br>WHEN VIDEO SIGNAL IS OUTPUT TO EXTERNAL DEVICE, SOME MODELS MAY NOT OUTPUT IMAGE TO LCD SCREEN. | |
| 10 | IMAGE FROM VIDEO DEVICE IS CURRENTLY SELECTED.<br>FOR SWITCHING TO IMAGE FROM COMPUTER, PUSH SOURCE BUTTON. | |
| 11 | IS CONNECTED COMPUTER TURNED ON? | |
| 12 | IS VIDEO SIGNAL OUTPUT FROM CONNECTED VIDEO DEVICE? | |
| 13 | RECOMMENDED RANGE OF PROJECTION DISTANCE IS ABOUT 1.2 m to 15.6 m. PLEASE INSTALL THE APPARATUS WITHIN THIS RANGE. | |
| 14 | PLEASE INSTALL THE APPARATUS SO THAT PROJECTION LIGHT IMPINGES UPON SCREEN AT A RIGHT ANGLE. | |
| 15 | PLEASE ADJUST SYNCHRONIZATION. | SYNCHRONIZATION ADJUSTMENT |
| 16 | PLEASE ADJUST TRACKING. | TRACKING ADJUSTMENT |
| 17 | "xxxx MODE" IS CURRENTLY RECOGNIZED. | |
| 18 | PLEASE SELECT SIGNAL SYSTEM. | SIGNAL SYSTEM SELECTION |
| 19 | CURRENTLY IN DOT PRESENTATION MODE.<br>FOR RESIZING, PUSH RESIZE BUTTON. | |
| 20 | CURRENTLY IN E-ZOOM MODE.<br>FOR RELEASING "E-ZOOM MODE", PLEASE PUSH CUSTOM BUTTON ON REMOTE CONTROLLER. | |

FIG. 13

| NO. | CONTENT OF MESSAGE | ADJUSTMENT ITEM |
|---|---|---|
| 21 | PLEASE ADJUST DISPLAY POSITION. | DISPLAY POSITION ADJUSTMENT |
| 22 | PLEASE ADJUST COLORS (RED/BLUE/GREEN). | COLOR ADJUSTMENT |
| 23 | PLEASE CHANGE NUMBER OF DISPLAYED COLORS OF COMPUTER. (THIS MAY CHANGE RESOLUTION/REFRESH RATE OF COMPUTER.) | |
| 24 | PLEASE ADJUST COLOR DEPTH/TINT. | COLOR DEPTH ADJUSTMENT TINT ADJUSTMENT |
| 25 | PLEASE REPLACE LAMP. IT WILL BE AUTOMATICALLY SWITCHED OFF WITHIN xxx HOURS. | |
| 26 | PLEASE ADJUST CONTRAST/BRIGHTNESS. | CONTRAST ADJUSTMENT BRIGHTNESS ADJUSTMENT |
| 27 | IS AUDIO INPUT CORRECTLY CONNECTED? | |
| 28 | SOUND OF COMPUTER IMAGE IS CURRENTLY SELECTED. | |
| 29 | SOUND OF VIDEO DEVICE IMAGE IS CURRENTLY SELECTED. | |
| 30 | IS EXTERNAL AUDIO DEVICE TURNED ON? | |
| 31 | VOLUME IS SET LOW. PLEASE ADJUST VOLUME. | VOLUME ADJUSTMENT |
| 32 | CURRENTLY OPERATING AT HIGH TEMPERATURE. ARE AIR INLETS/OUTLETS CLOSED? | |

METHOD AND ADJUSTING DEVICE FOR PROJECTION-TYPE DISPLAY

This is a Continuation of U.S. application Ser. No. 11/808,333 filed Jun. 8, 2007, which is a Continuation of U.S. application Ser. No. 09/508,640 filed Jun. 16, 2000, which in turn is a National Stage of PCT/JP99/03606 filed Jul. 2, 1999 now U.S. Pat. No. 7,265,765, filed Sep. 4, 2007. The disclosures of the prior applications are hereby incorporated by reference herein in their entirety.

BACKGROUND OF THE INVENTION

1. Field of Invention

The present invention relates to an image display device including an image input means to which an image signal is input, an image display means for forming an optical image based on the input signal from the image input means, and a device adjusting means for adjusting the internal conditions of the device, and relates to an adjusting method for the image display device.

2. Description of Related Art

Hitherto, image display devices including an image input means (image signal input terminal) to which an image signal is input, an image display means (image display system) for forming an optical image based on the input signal from the image input means, and a device adjusting means (device adjusting system) for adjusting the internal conditions of the device have been employed. Concerning these image display devices, there is, for example, a projection display device for optically processing a light beam emitted from a light source, forming an optical image in accordance with image information, and enlarging and projecting the image onto a projection screen by means of a projection lens.

An image input means of the projection display device is designed so as to be capable of connecting various external devices, such as a computer and a video. By connecting a computer or the like to the projection display device, an image signal from the computer or the like may be displayed on a large screen, such as the projection screen. A multimedia presentation system using a computer is efficiently constructed.

Various computers and the like are connected to the image display device. Conditions of the interior of the device, such as the image display means, are required to be adjusted in accordance with an image signal and an audio signal from a computer or the like connected thereto. Hence, the image display device is generally provided with the device adjusting means for adjusting the internal conditions of the device, such as image adjustment and output audio adjustment, on a display screen by the image display means.

However, the conventional image display device has problems, described as follows.

Specifically, technical terms, such as refresh rate, tracking, horizontal synchronization, and vertical synchronization, are used in adjustment items by the device adjusting means. It is difficult for general users to understand these technical terms. When such a general user performs these adjustments, the user is required to adjust the device while referring to a manual or the like, making the adjusting operation burdensome.

When the display screen of the image display device fails, the general user may not know which adjustment item is required to be adjusted. It is difficult to realize an optimal screen display.

SUMMARY OF THE INVENTION

It is an object of the present invention to provide an image display device including an image input means to which an image signal is input, an image display means for forming an optical image based on the input signal from the image input means, and a device adjusting means for adjusting the internal conditions of the device, in which adjustment by the device adjusting means is easily performed. The present invention also provides an adjusting method for the image display device.

To this end, according to the present invention, there is provided an image display device including an image input means (image signal input terminal) to which an image signal is input, an image display means (image display system) for forming an optical image based on the input signal from the image input means, and a device adjusting means (device adjusting system) for adjusting the internal conditions of the device. The image display device may include an adjusting operation support means (adjusting operation support device) for supporting the operation of the device adjusting means.

The adjusting operation support means represents a means including a help function for providing, when adjusting by the device adjusting means, information about the adjustment. For example, the adjusting operation support means provides adjusting operation support information indicating which part is required to be adjusted on a display screen by the image display means in accordance with an event that has occurred in the image display device.

According to the present invention, the image display device is provided with the adjusting operation support means. Hence, a user may easily perform adjustment using the device adjusting means based on the adjusting operation support information by the adjusting operation support means, without referring to a manual or the like.

As described above, the above-described adjusting operation support means may display the adjusting operation support information thereof by the image display means. Preferably, the adjusting operation support information displayed by the image display means is switchably displayed by a switch mounted on the image display device and/or on a remote controller for controlling the image display device.

Specifically, the adjusting operation support information is switchably displayed by the switch. When an image based on an image signal or the like is displayed by the image display means, the adjusting operation support information may be displayed by the image display means at any time using the switch. This improves operability of calling-up of the adjusting operation support information. In particular, when the remote controller is provided with the switch, a speaker of a presentation may directly adjust the image display device by calling-up the adjusting operation support information, thus performing appropriate adjustment of the screen display according to the content of the presentation by the speaker.

Preferably, the above-described adjusting operation support means is capable of executing the device adjusting means based on the adjusting operation support information displayed by the image display means.

Specifically, the adjusting operation support means is capable of executing the device adjusting means. Thus, the user may directly perform the adjusting operation while referring to the obtained adjusting operation support information. Further simplification of the adjusting operation for the image display device is realized.

The adjusting operation support information includes a plurality of support information items. Preferably, the above-described image display device includes an information display determining means (information display determining device) for regulating the display of the support information items discriminated as unnecessary to be displayed from the support information items.

Specifically, the image display device is provided with the information display determining means. Thus, the support information items which are not required to be displayed are regulated, and only the minimum support information items are displayed. It is therefore ensured that appropriate adjusting operation support information is provided to the user.

Preferably, the above-described adjusting operation support means displays the support information items in a hierarchical structure.

"Displaying in a hierarchical structure" means, for example, displaying items concerning an object to be adjusted, such as image items and sound items, as major classification items, displaying items concerning an event which may have occurred in the selected object as intermediate projection, and displaying items concerning more details of the event as minor classification items.

Specifically, the support information items by the adjusting operation support means are displayed in the hierarchical structure. It is therefore ensured that adjustment support information appropriate for the event that has occurred in the image display device is obtained. This further improves the operability. The number of the support information items to be displayed is minimized, thus improving the visibility of a background image in accordance with the image signal. In particular, when the user performs adjustment concerning image quality, such as contrast and tint, the user may perform the adjusting operation while confirming variations in the background image.

Preferably, the above-described adjusting operation support means is capable of displaying the internal conditions of the device by the image display means.

The "internal conditions of the device" mean, for example, a signal-mode of the input image signal, or alternatively, when the device is the projection display device described above, the operating time of a light source, the number of illuminations, the remaining lifetime of a light source lamp, and the like.

Specifically, the adjusting operation support means is capable of displaying the internal conditions of the device. Therefore, the user may confirm the internal conditions in advance, thus understanding beforehand which part is required to be adjusted. This increases the speed of the adjusting operation.

An adjusting method for an image display device according to the present invention is for an image display device including an image input means to which an image signal is input, an image display means for forming an optical image based on the input signal from the image input means, and a device adjusting means for adjusting the internal conditions of the device. The adjusting method includes an item information providing step for providing item information classifying an object to be adjusted by the device adjusting means, an item selecting step for selecting an item from items provided by the item information providing step, an event information providing step for providing event information which may occur for the object to be adjusted according to the item selected by the item selecting step, an event selecting step for selecting an event from events shown in the event information providing step, and a support information providing step for providing, based on the event selected by the event selecting step, adjusting operation support information that supports the adjusting operation by the device adjusting means. The image display device is adjusted based on the adjusting operation support information provided by the support information providing step.

According to the present invention, necessary adjusting operation support information is obtained in accordance with each of these steps. Therefore, the user easily performs appropriate adjustment using the device adjusting means without referring to a manual or the like when adjusting the image display device.

In the item information providing step, the object to be adjusted is provided as classified items. An event which may occur for the object selected to be adjusted is provided in the event information providing step. The adjustment support information according to the selected event is provided in the support information providing step. It is therefore ensured that support information appropriate for the event that has occurred in the image display device is obtained. This further improves the operability.

When each information is displayed on a display screen by the image display means, the information is minimized on the display screen, thus improving the visibility of a background image according to the image signal. In particular, when the user performs adjustment concerning the image quality, such as contrast and tint, the user may perform the adjusting operation while confirming variations in the background image.

On the adjusting method according to the present invention, the same limitations as the image display apparatus according to the present invention may be imposed. Accordingly, the same operations and advantages as the above-described operations and advantages may be obtained.

BRIEF DESCRIPTION OF THE DRAWINGS

FIG. 5 is a front view of a screen displaying support information items (major classification) by the adjusting operation support means in the embodiment.

FIG. 6 is a front view of a screen displaying support information items (intermediate classification) by the adjusting operation support means in the embodiment.

FIG. 7 is a front view of a screen displaying support information items (minor classification) by the adjusting operation support means in the embodiment.

FIG. 8 is a front view of a screen displaying the adjusting operation support information by the adjusting operation support means in the above embodiment.

FIG. 9 is a table showing a structure of the adjusting operation support means in the embodiment.

FIG. 10 is a table showing the structure of the adjusting operation support means in the embodiment.

FIG. 11 includes tables showing the structure of the adjusting operation support means in the embodiment.

FIG. 12 is a table showing the structure of the adjusting operation support means in the embodiment.

FIG. 13 is a table showing the structure of the adjusting operation support means in the embodiment.

DETAILED DESCRIPTION OF PREFERRED EMBODIMENTS

An embodiment of the present invention is described hereinafter based on the drawings.

(1) Overall Structure of Image Display Device 1

Figure 1:
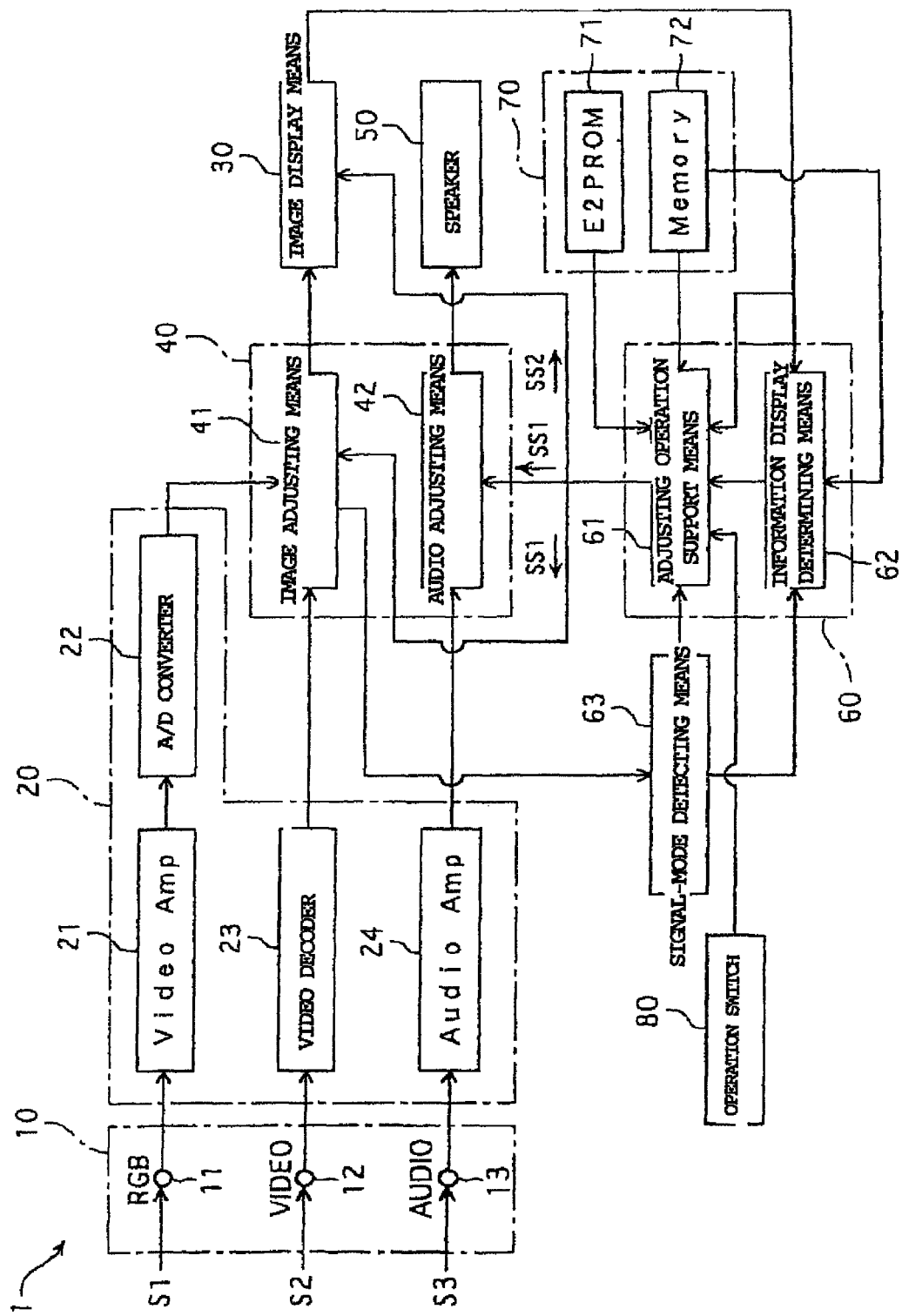
FIG. 1 is a block diagram of a structure of an image display device according to an embodiment of the present invention.

FIG. 1 shows a block diagram of a structure of an image display device according to an embodiment of the present invention. An image display device 1 includes an image input means (image signal input terminal) 10, a signal processing means (signal processing device) 20, an image display means (image display system) 30, a device adjusting means (device adjusting system) 40, a speaker 50, a CPU 60, a storage means (storage device) 70, and operation switches 80.

The image input means 10 is a part to which external devices, such as a computer and a video device, are connected. The image input means 10 is provided with an RGB input terminal 11 to which an RGB signal S1 from the computer is input, a video input terminal 12 to which a composite video signal S2 from the video device is input, and an audio input terminal 13 to which an audio signal S3 from the computer and the video device is input.

The signal processing means 20 is a part for amplifying and converting the signals input by the image input means 10. The signal processing means 20 is provided with a video amplifier 21, an A/D converter 22, a video decoder 23, and an audio amplifier 24. The video amplifier 21 is a part for amplifying the RGB signal S1 input from the RGB input terminal 11. The output of the video amplifier 21 undergoes analog-to-digital-conversion by the A/D converter 22. The video decoder 23 converts the composite video signal 52 input from the video input terminal 12 into an RGB signal, which in turn is digitized and output. The audio amplifier 24 is a part for amplifying the audio signal S3 input from the audio input terminal 13.

The device adjusting means 40 is a part for adjusting the image signals S1 and S2 and the audio signal S3 input via the image input means 10 and the signal processing means 20. The device adjusting means 40 is provided with an image adjusting means (image adjusting device) 41 and an audio adjusting means (audio adjusting device) 42. The image adjusting means 41 is a part for performing adjustment so that an appropriate image is displayed by the image display means 30 based on the input RGB signal S1 or the composite video signal 52. In this example, when the RGB signal S1 is input, the image adjusting means 41 adjusts synchronization, tracking, refresh rate, color, display position, contrast, brightness, and the like. When the composite video signal S2 is input, the image adjusting means 41 adjusts signal systems, e.g., NTSC and PAL, tint, color strength, contrast, brightness, and the like.

The audio adjusting means 42 is a part for performing adjustment so that an appropriate sound is output from the speaker 50 based on the input audio signal S3. Mainly, the audio adjusting means 42 adjusts the volume of the speaker 50.

The CPU 60 obtains information concerning the internal conditions of the image display device. Based on the obtained information, the CPU 60 outputs control signals SS1 and SS2 to the device adjusting means 40 and the image display means 30 described above. The CPU 60 includes an adjusting operation support means (adjusting operation support device) 61 and an information display determining means (information display determining device) 62. The adjusting operation support means 61 outputs the control signal SS2 to the image display means 30 so that the adjusting operation support information is displayed as a menu screen. Based on an adjustment item selected by the operation switches 80, the adjusting operation support means 61 outputs the control signal SS1 to the image adjusting means 41 and the audio adjusting means 42. The information display determining means 62 is a part for determining which support information items should be displayed by the adjusting operation support means 62 on the image display means 30.

Although omitted in FIG. 1, the CPU 60 includes a lamp-life comparing means (lamp-life comparator) and an overheating determining means (overheating determining device). The lamp-life comparing means compares data of a light source lamp supported by a light source lamp unit 8 (described hereinafter), such as lifetime, number of life-illuminations, the time limit for replacement, and the number of illuminations limit for replacement, with data of a light source lamp 181, such as the operating time, stored in an E²PROM 71 forming the storage means 70. The lamp-life comparing means may compare the data with respect to the number of illuminations data. The overheating determining means uses temperature sensors (not shown) provided at each part of the interior of the device to determine whether there is an overheated portion in the image display device 1.

If the operating time of the light source lamp 181 exceeds the lifetime, or if it is determined that the interior of the device is overheating, a control signal for forcedly switching off the light source lamp 181 is output to the image display means 30. At the same time, a control signal for causing an indicator lamp (not shown) indicating the power charging state of the image display device 1 to flash is output.

In addition, the image display device 1 includes a signal-mode detecting means (signal-mode detector) 63 for detecting whether the image signal input to the image adjusting means 41 is the RGB signal S1 or the composite video signal S2. The signal-mode of the image signal, which is detected by the signal-mode detecting means 63, is output to the adjusting operation support means 61. The signal-mode and the adjusting operation support information are displayed on the image display means 30. The detected signal-mode is also output to the information display determining means 62, which is then used as a reference when determining support information items to be displayed by the adjusting operation support means 61.

The storage means 70 is a part for storing internal information of the image display device 1, a program, and the like. The storage means 70 includes the E²PROM (Electric Eraserble Programmable Read Only Memory) 71 and a memory 72. The E²PROM 71 stores information, such as the number of illuminations and the operating time of the light source lamp 181 described below, and the operating time of the image display device 1. Similarly, the memory 72 is a non-volatile memory from which the memory content is not lost even when the image display device 1 is turned off. The memory 72 stores a program written in a predetermined language. The CPU 60 calls up the program, thus realizing therein the adjusting operation support means 61 and the information display determining means 62 described above.

(2) Structure of Optical System of Image Display Means 30

Figure 2:
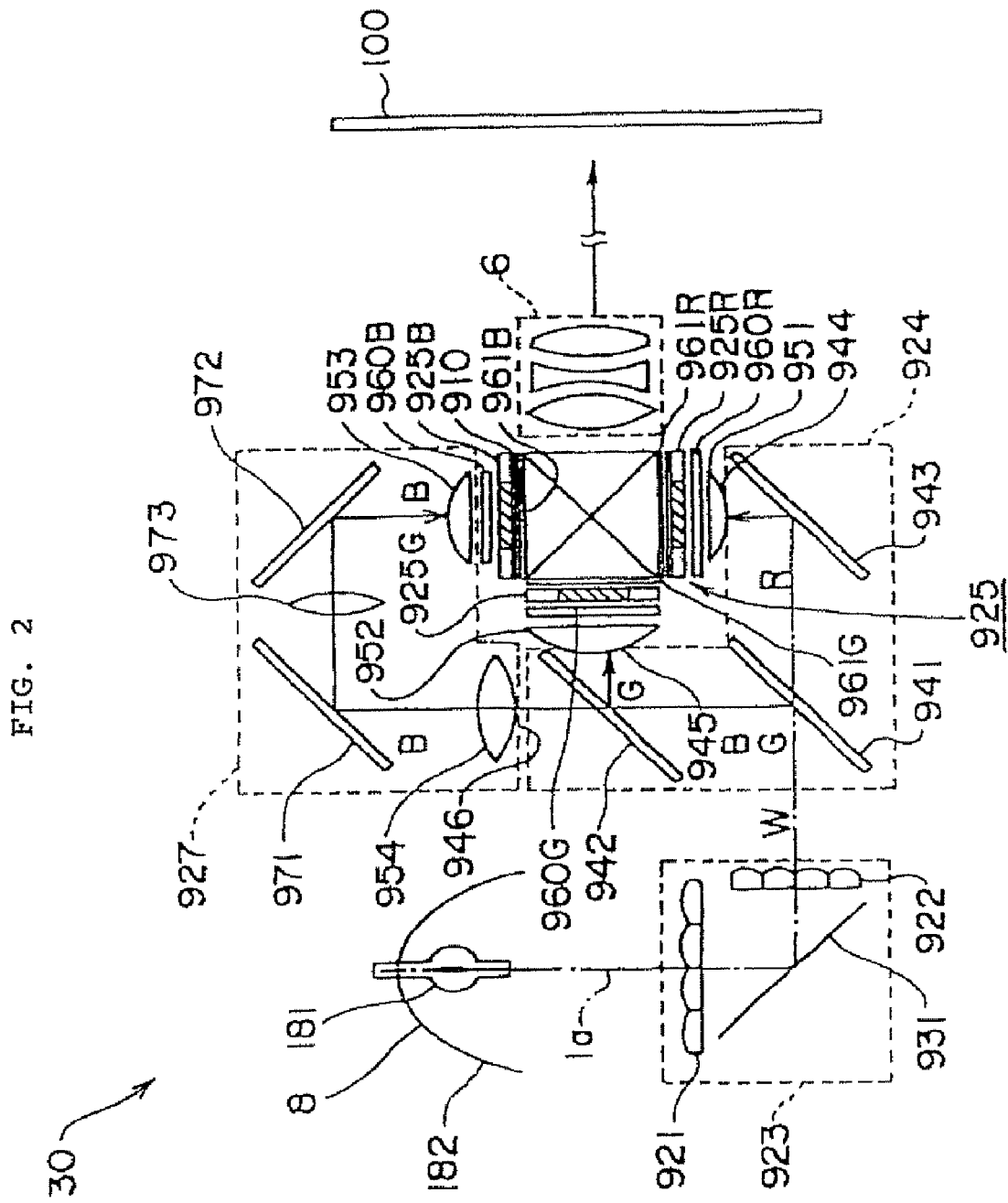
FIG. 2 is a schematic illustration of a structure of an optical system of an image display means in the embodiment.

The image display means 30 includes a light modulation system 925 (described hereinafter) for modulating a light beam emitted from the light source lamp in accordance with the image signal. The image display means 30 is of a projection-type for enlarging and projecting the light beam modulated by the light modulation system 925. As shown in FIG. 2, the image display means 30 includes the light source lamp unit 8; an illuminating optical system 923 for making the in-plane illumination distribution of a light beam (W) from the light source lamp unit 8 uniform; a color separation optical system 924 for separating the light beam (W) from the illuminating optical system 923 into red (R), green (G), and blue (B); the light modulation system 925 for modulating the light beams R, G, and B in accordance with the image information; and a prism unit 910 as a color synthesizing optical system for synthesizing the modulated light beams.

The light source lamp unit 8 includes the light source lamp 181 and a lamp guide (not shown) for receiving a light source device formed of the light source lamp 181 and a reflector 182. The lamp guide holds lamp information concerning the light source lamp 181, such as output power, lifetime, and the number of life-illuminations. Based on the held lamp information, an estimation of the operating time of the light source lamp 181 and comparison with the lifetime are performed.

The illuminating optical system 923 includes a reflecting mirror 931 for reflecting an optical axis 1*a* of the light beam W emitted from the light source lamp 181 in the forward direction of the device, and a first lens plate 921 and a second lens plate 922 disposed with the reflecting mirror 931 therebetween. The first lens plate 921 includes a plurality of rectangular lenses disposed in a matrix arrangement. The first lens plate 921 separates the light beam emitted from the light source into a plurality of partial light beams, and each of the partial light beams is condensed near the second lens plate 922.

The second lens plate 922 includes a plurality of rectangular lenses disposed in a matrix arrangement. The second lens plate 922 has a function of superimposing each of the partial light beams emitted from the first light plate 921 onto light valves 925R, 925G, and 925B (described hereinafter) which form the light modulation system 925.

Accordingly, in the image display device 1 in this example, the liquid crystal light valves 925R, 925G, and 925B are illuminated with light having approximately uniform illuminance by means of the illuminating optical system 923. Therefore, it is possible to obtain a projection image without illuminance irregularity.

The color separation optical system 924 includes a blue-green reflecting dichroic mirror 941, a green reflecting dichroic mirror 942, and a reflecting mirror 943. The blue-green reflecting dichroic mirror 941 reflects a blue light beam B and a green light beam G contained in the light beam W emitted from the illuminating optical system 923 at a right angle, which in turn are guided toward the green reflecting dichroic mirror 942.

The red light beam R passes through the blue-green reflecting dichroic mirror 941, which in turn is reflected at a right angle by the reflecting mirror 943 disposed in the rear of the blue-green reflecting dichroic mirror 941. This light beam is then emitted from a red light beam R exit section 944 to the prism unit 910. Next, of the blue light beam B and the green light beam G reflected at the blue-green reflecting dichroic mirror 941, the green reflecting dichroic mirror 942 exclusively reflects the green light beam G at a right angle. This light beam is then emitted from a green light beam G exit section 945 to the color synthesizing optical system (prism unit 910). The blue light beam B having passed through the green reflecting dichroic mirror 942 is emitted from a blue light beam B exit section 946 to a guiding system 927. In this example, the distances from an exit section of the light beam W in the illuminating optical system 923 to each of the exit sections 944, 945, and 946 of each of the color light beams are set to be equal.

Condensing lenses 951 and 952 are respectively disposed at the exit sides of the exit sections 944 and 945 of the red light beam R and the green light beam G in the color separation optical system 924. Hence, the red light beam R and green light beam G emitted from each of the exit sections enter the condensing lenses 951 and 952, respectively, and are collimated.

The collimated red and green light beams R and G pass through incident polarizers 960R and 960G, respectively, to enter the liquid crystal light valves 925R and 925G, respectively, and are modulated. In contrast, the blue light beam B is guided through the guiding system 927 to the corresponding liquid crystal light valve 925B and is similarly modulated.

The liquid crystal light valves 925R, 925G, and 925B are liquid crystal panels of an active matrix system using a p-si-TFT as switching devices. The liquid crystal light valves 925R, 925G, and 925B include, respectively, a data driver and a scanning driver, not shown in FIG. 2, for driving pixels of the liquid crystal light valves 925R, 925G, and 925B.

The guiding system 927 includes a condensing lens 954 disposed at the exit side of the exit section 946 of the blue light beam B, an incident reflecting mirror 971, an exit reflecting mirror 972, an intermediate lens 973 disposed between these reflecting mirrors, and a condensing lens 953 disposed in front of the liquid light valve 925B. The blue light beam B emitted from the condensing lens 953 enters the liquid crystal light valve 925B via an incident polarizer 960B, and is then modulated. The optical path length of each of the light beams, i.e., the distance from the light source lamp 181 to each of the liquid crystal panels, is the greatest for the blue light beam B. Thus, the luminous energy loss of this light beam is the greatest. By interposing the guiding system 927, the luminous energy loss is suppressed.

The light beams R, G, and B, having passed through the liquid crystal light valves 925R, 925G, and 925B and been modulated, enter the prism unit 910 via exit polarizer 961R, 961G, and 96113, respectively, and are synthesized. The color image synthesized by the prism unit 910 is enlarged and projected via a projection lens unit 6 onto a projection screen 100 disposed at a predetermined location.

(3) Structure of Operation Switches 80

Figure 3:
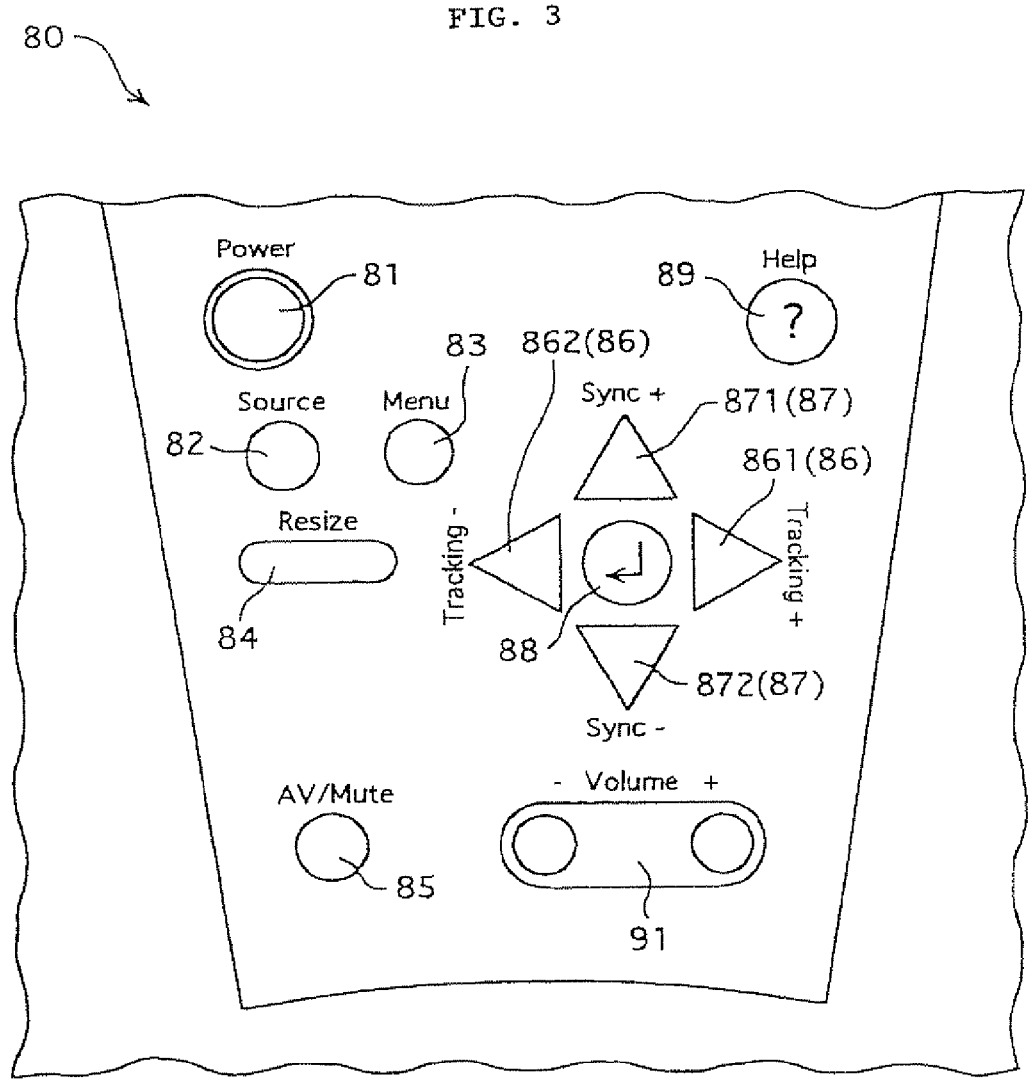
FIG. 3 is a plan view of a structure of operation switches in the embodiment.

Each of the component parts of the projection image display device 1 described above is received in an outer casing, which is not shown in the drawing. As shown in FIG. 3, the operation switches 80 for adjusting internal conditions of the device are provided on the top surface of the outer casing.

The operation switches 80 include a power supply switch button 81, an input switching button 82, a menu button 83, a resize button 84, an AV/mute button 85, tracking adjustment buttons 86, synchronization adjustment buttons 87, a confirmation button 88, a help button 89, and volume control buttons 91.

The power supply switch button 81 turns the image display device 1 on/off. The input switching button 82 switches between the RGB signal S1 and the composite video signal S2 when forming a projected image to be projected onto the projection screen 100. The menu button 83 confirms the present setting of the image display device 1. When the menu button 83 is pressed while the projected image based on the image signal S1 or S2 is being projected, the present conditions of the image display device 1, such as vertical and horizontal synchronizing frequencies, resolution, and driving time of the lamp, will be displayed.

The resize button 84 adjusts the size of the projected image to be projected onto the projection screen 100. The AV/mute button 85 switches to display a blank screen in a predetermined color and a user logo mark, and simultaneously, temporarily cuts off the audio output from the speaker 50. The tracking adjustment buttons 86 adjust tracking of the image display means 30, consisting of a plus (+) direction adjustment button 861 and a minus (−) direction adjustment button 862. The synchronization adjustment buttons 87 adjust horizontal synchronization of the image display means 30. In the same manner as the tracking adjustment buttons 86, the synchronization adjustment buttons 87 consist of a plus (+) direction adjustment button 871 and a minus (−) direction adjustment button 872. The tracking adjustment buttons 86 and the synchronization adjustment buttons 87 serve as cursor motion keys when a help menu screen 102 displaying adjusting operation support information described below is displayed.

The confirmation button 88 confirms the display of the projected image based on the tracking and the horizontal synchronization adjusted by the tracking adjustment buttons 86 and the synchronization adjustment buttons 87, respectively. For operational simplification, the button is marked with a line-feed (enter) mark. The help button 89 switches to display the help menu screen 102 while having a projected image 101, which is described hereinafter, as a background. For operational simplification, as in the confirmation button 88, a question mark is added to the button. The volume control buttons 91 control the volume of the sound output from the speaker 50.

The image display device 1 in the example includes a remote controller, which is not shown in the drawing, for operating the image display device 1 by remote control. The remote controller is provided with adjusting/switching buttons having the same functions as the operation switches 80 described above. In addition, an E-zoom custom button is provided on the remote controller for enabling a user, e.g., a speaker of a presentation or the like, to partially enlarge the projected image during the presentation.

(4) Operation of Adjusting Operation Support Means 61

Next, an operation of the adjusting operation support means 61 in the projection image display device 1 having the structure as described above is described with reference to a flowchart shown in FIG. 4 and to display screens shown in FIGS. 5 to 8. In the description below, it is assumed that a computer is connected to the image display device 1 and the RGB signal S1 is input, thus displaying a projected image. Since the projected image is distorted, tracking is performed.

(1) The help button 89 of the operation switches 80 is pressed while the projected image is being displayed, thus executing an item information providing step. Specifically, as shown in FIG. 5, the help menu screen 102 is displayed while having the projected image 101 as a background. Major classification items are displayed for enabling a user to select which part of the image display device 1 has trouble (A1 in FIG. 4). The specific major classification items in this example consist of "image items", "sound items", and "indicator is flashing". The "image items" provide support information when a problem occurs in matching between the image signal S1 or S2 and the image display means 30. The "sound items" provide support information when no appropriate sound is output from the speaker 50 even when the audio signal S3 is input. The "indicator is flashing" provides support information when the indicator lamp is flashing. The indicator lamp flashes when the light source lamp 181 is not switched on even when the image display device 1 is turned on or when the temperature sensor detects an overheated state.

(2) On the lower part of the help menu screen 102 described above, information concerning operation processes on the help menu screen 102 is displayed. Looking at the projected image 101, an operator moves a cursor to the major classification item to be selected by means of the plus (−) direction adjustment button 871 and the minus (−) direction adjustment button 872 of the operation switch synchronization adjustment buttons 87. Then, the operator presses the confirmation button 88 marked with the line-feed mark, thus executing an item selecting step (A2 in FIG. 4). It may be understood from FIG. 5 that, when the help button 89 marked with "?" of the operation switches 80 is pressed, the state in which the help menu display screen 102 is displayed returns to the normal screen.

(3) When the major classification item is selected by the confirmation button 88, an event information providing step is executed. Specifically, as shown in FIG. 6, intermediate classification items subordinate to the selected major classification item are displayed on the help menu screen 102 (A3 in FIG. 4). In this example, the projected image is distorted. By selecting the "image items" from the major classification items, the intermediate classification items concerning the image are displayed, as shown in FIG. 6. In the same process as described above, "image is distorted" is selected and confirmed (A4 in FIG. 4). When the help menu screen 102 concerning the intermediate classification items is displayed, the menu button 83 may be pressed to return to the help menu screen 102 (see FIG. 5) concerning the major classification items, as seen in FIG. 6. To return to the normal screen, the help button 88 may then be pressed as described above.

(4) In the interior of the image display device 1, the information display determining means 62 confirms that the image signal input via the signal-mode detecting means 63 is the RGB signal S1. Then, the information display determining means 62 restricts the display of minor classification items based on the composite video signal S2 by the adjusting operation support means 61 (A5 in FIG. 4). Of the intermediate classification items described above, some have no minor classification items. In such a case, the display of the minor classification items is skipped, and the adjusting operation support information is displayed (branch operation A6 in FIG. 4).

Figure 4:
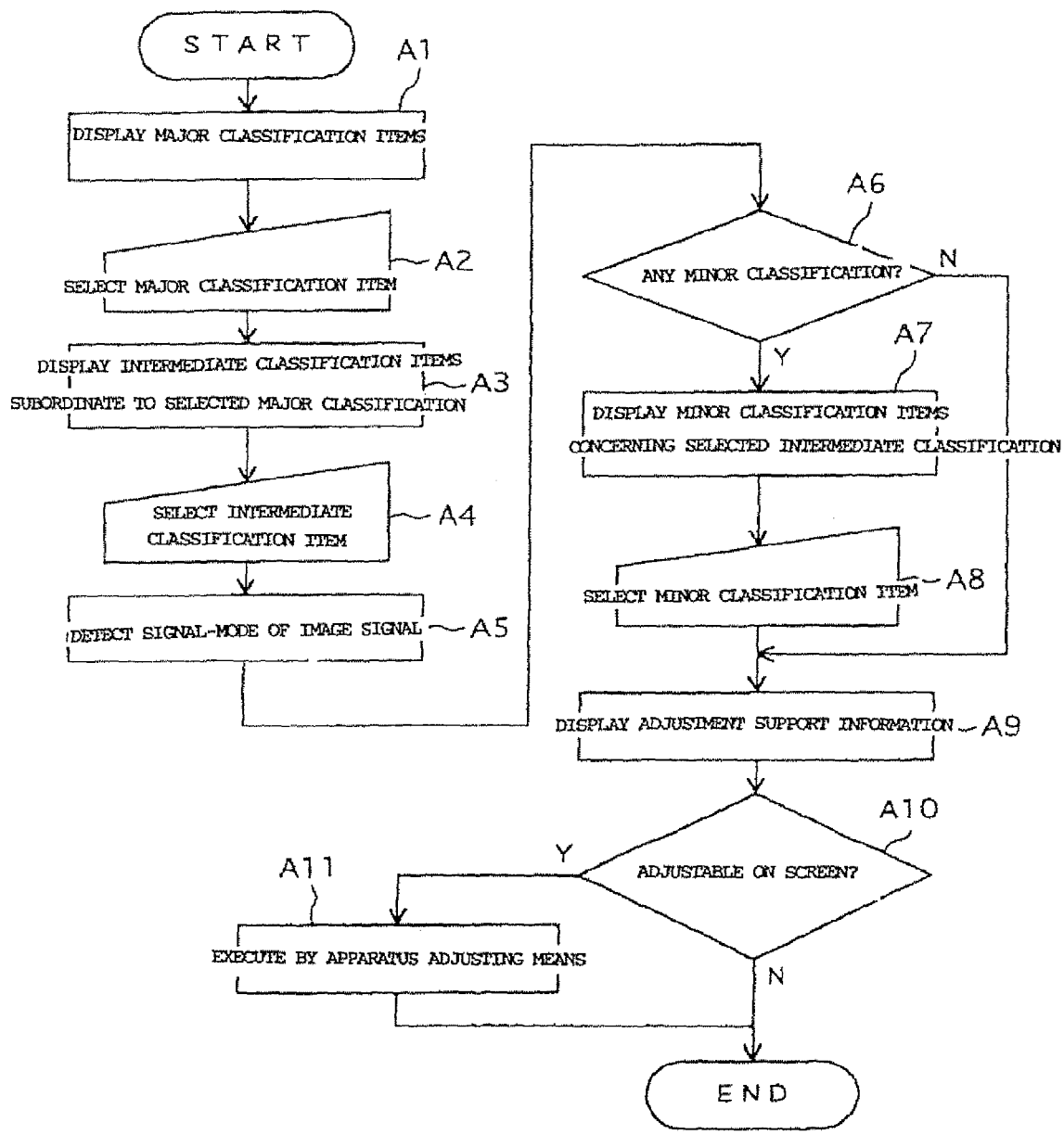
FIG. 4 is a flowchart for describing an operation of an adjusting operation support means in the embodiment.

(5) When the intermediate item is selected, as shown in FIG. 7, minor classification items subordinate to the selected intermediate classification item are displayed (A7 in FIG. 4). In the same process as described above, "vertical stripes of noise appear" is selected, and an event selection step is executed (A8 in FIG. 4). As shown in FIG. 8, the adjusting operation support information corresponding to this minor classification item is displayed on the help menu screen 102 (A9 in FIG. 4).

(6) When the adjusting operation support information shown in FIG. 8 concerning tracking is displayed, the image adjusting means 41 may be operated on the help menu screen 102 to execute an adjustment executing step. Of the adjusting operation support information, some items cannot be adjusted on the help menu screen 102. Hence, the adjusting operation support means 61 determines whether the selected support information item is adjustable on the screen (branch processing A10 in FIG. 4). Only when the image is adjustable on the screen, the control signal SS1 for adjusting the image on the screen is output (processing A11 in FIG. 4). Specifically, when executing the adjustment executing step, the plus (+) direction adjustment button 861 and the minus (−) direction adjustment button 872 of the tracking adjustment buttons 86 are operated, thus varying the numeric value of tracking in the help menu screen 102 in FIG. 8. In the help menu screen 102 shown in FIG. 8 concerning the tracking adjustment, the menu button 83 or the confirmation button 88 may be pressed so that the screen returns to the help menu 102 (see FIG. 7) in the previous step where the minor classification items are shown. When the help button 89 is pressed, the screen returns to the normal screen.

(5) Specific Structures of Adjusting Operation Support Means 61 and Information Display Determining Means 62

The adjusting operation support means 61 and the information display determining means 62, which operate as described above, are programs invoked from the memory 72 to the CPU 60 by pressing the help button 89. They are formed based on the flowchart shown in FIG. 4.

In order to execute the item information providing step, the event information providing step, and the adjustment support information providing step, the adjusting operation support means 61 is required to display adjusting operation support information that differs in accordance with the selection of the support information items, such as the major classification items, the intermediate classification items, and the minor classification items. Therefore, as shown in FIGS. 9 to 11, the adjusting operation support means 61 is arranged as a program having a hierarchical structure for performing branch processing in accordance with the major classification items, the minor classification items, branch conditions, and the intermediate classification items. Display messages of the adjusting operation support information to be finally displayed on the help menu screen 102 are set in accordance with branch patterns of the minor classification items. In accordance with rightmost message numbers shown in FIGS. 9 to 11, messages shown in FIGS. 12 and 13 are displayed. Furthermore, when adjustment corresponding to a displayed message is executable on the help menu screen 102, as described above, each button of the operation switches 80 is operated to adjust the internal conditions of the image display device 1.

In accordance with the selection of the support information items, the adjusting operation support means 61 described above may display the operating time and the number of illuminations of the light source lamp 181 obtained from the $E^2PROM$ 71 and the signal-mode of the image signal detected by the signal-mode detecting means 63.

The information display determining means 62 is a program installed together with the adjusting operation support means 61. When the information display determining means 62 determines, in the support information items ranging from the major classification items to the minor classification items, that there exist support information items which are not necessary to be displayed based on the information on the internal conditions of the device obtained from the signal-mode detecting means 63 and the $E^2PROM$ 71, the information display determining means 62 restricts the display of the information by the adjusting operation support means 61. In this example, the information display control means 62 restricts the display of a support information item of the support information items shown in FIGS. 9 to 11 in the following cases.

(1) When the image display device 1 is turned on, the lamp-life comparing means in the CPU 60 compares the operating time of the light source lamp 181 with its lifetime. The overheating determining means determines an overheated state in the device. When it is determined that these values do not reach predetermined thresholds and the device is thus capable of being used as is, the information display determining means 62 restricts the display of "indicator is flashing" in the major classification items.

(2) When the lamp-life comparing means determines that the operating time of the light source lamp does not reach the time limit for replacement, as in the above case, the information display determining means 62 restricts the display of the adjusting operation support information "Please replace the lamp. It will be automatically switched off within xxxx hours." in the intermediate classification items "poor tint" and "image is dark" under the major classification item "image items".

(3) When the signal-mode detecting means 63 detects, while the image signal is being input, that the input image signal is the RGB signal S1 or the composite video signal S2, the information display determining means 62 restricts the display of the intermediate classification item ""This signal is of an unacceptable type for this projector" is displayed" under the major classification item "image items". Similarly, when the signal-mode detecting means 63 detects the image signal, the information display determining means 62 restricts the display of the intermediate classification item ""No video signal is input" is displayed" under the major classification item "image items".

(4) Similarly, when the CPU 60 detects the audio signal S3, the information display determining means 62 restricts the display of the adjusting operation support information, i.e., "is an external audio device turned on?" and "volume is set low" of the intermediate classification item "no sound is generated" of the major classification item "sound items".

(6) Advantages of the Embodiment

According to the embodiment as described hereinabove, there are advantages as follows.

(1) Specifically, the image display device 1 is provided with the adjusting operation support means 61. Based on the adjusting operation support information by the adjusting operation support means 61, the user easily adjusts the device 1 by the device adjusting means 40 without referring to a manual or the like. In particular, the projection image display device 1 as in this example is often employed by many speakers at academic society presentations and the like. Thus, the image display device 1 is substantially advantageous.

(2) The adjusting operation support information is switchably displayed by the help button 89 to be used as a switch. Even when the projected image 101 based on the image signal S1, S2, or the like, is displayed on the image display means 30, the help menu screen 102 displaying the adjusting operation support information may be displayed at any time. Hence, operability of the calling-up of the adjusting operation support information is improved.

(3) Furthermore, the adjusting operation support means 61 is capable of executing the device adjusting means 40 on the display screen by the adjustment executing step. The user may directly perform adjusting operation while referring to the obtained adjusting operation support information. Further simplification of the adjusting operation of the image display device 1 is accomplished.

(4) The image display device 1 includes the information display determining means 62. The support information items which are not necessary to be displayed are restricted, and only the minimum support information items necessary to be displayed are displayed. Hence, it is ensured that appropriate adjusting operation support information is provided to the user.

(5) The adjusting operation support means 61 has a hierarchical structure as shown in FIGS. 9 to 11, thus stepwisely executing the item information providing step, the item selecting step, the event information providing step, the event selecting step, and the adjustment support information providing step. Thus, adjustment support information appropriate for an event that has occurred in the image display device 1 is certainly obtained. The number of the support information items to be displayed is minimized, thus increasing the visibility of the background image 101 in accordance with the image signal S1 or S2. In particular, when adjusting image quality, such as contrast or tint, the user may perform the adjusting operation while confirming variations in the background image 101.

(6) In addition, the adjusting operation support means 61 is capable of displaying the internal conditions of the device, e.g., the operating time of the light source lamp 181 and the signal-mode and the signal system of the input image signal S1 or S2. Hence, the user may confirm the internal conditions in advance to understand which part is required to be adjusted. This increases the speed of the adjusting operation.

(7) Modifications of the Embodiment

The present invention is not limited to the embodiment described above. The present invention includes modifications as set forth hereinafter.

(1) Although the adjusting operation support means 61 of the embodiment described hereinabove is actuated by operating the operation switches 80 mounted on the outer casing of the image display device 1, the present invention is not limited to this embodiment. Specifically, the adjusting operation support means 61 may be operated by a remote controller for remotely controlling the image display device 1.

By actuating the adjusting operation support means 61 by the remote controller, a speaker of a presentation or the like may directly perform adjustment while confirming the adjusting operation support information. Hence, the speaker may perform the appropriate adjustment of the screen display in accordance with the content of the presentation by the speaker.

(2) In addition, the adjusting operation support means 61 of the embodiment described hereinabove has the hierarchical structure of the support information items shown in FIGS. 9 to 11 by employing branch processing within the program. However, the present invention is not limited to this embodiment. Specifically, the adjusting operation support means 61 may include a database program having a table structure as shown in FIGS. 9 to 11.

(3) Although the image display device 1 of the embodiment described hereinabove uses the liquid crystal light guides 925R, 925G, and 925B as modulation devices, the present invention is not limited to this embodiment. The present invention is applicable to an image display device which employs a modulation device of another system, such as a DMD (Digital Micromirror Device: a registered trademark of the TI company).

(4) Although the image display device 1 of the embodiment described hereinabove is a projection image display device, the present invention is not limited to this embodiment. The present invention may be applied to a normal image display device, such as a CRT display and an LCD display.

(5) Various modifications in the structure, shape, and the like may be made in the present invention without departing from the scope of achieving the objects of the present invention.

INDUSTRIAL APPLICABILITY

As described above, according to the image display device and the adjusting method therefor of the present invention, adjustment by the device adjusting means based on the adjusting operation support information is performed easily. In particular, the present invention is suitable for optically processing the light beam emitted from the light source, forming the optical image in accordance with the image information, and enlarging and projecting the image by the projection lens onto the projection screen.

What is claimed is:

1. A method of displaying support information which enables an operator to adjust settings of an image display device or to solve a problem occurring in the image display device, the method comprising:
   detecting, with a central processing unit, internal conditions of the image display device;
   providing inquiring messages based on the detected internal conditions identifying problems occurring in the image display device and assisting messages each showing information for assisting an operator to solve a respective one of the identified problems;
   providing associations between the inquiring messages and the assisting messages, each of the associations being defined by at least one of the detected internal conditions;
   displaying the inquiring messages on a help screen such that an operator can select one of the inquiring messages; and
   displaying at least one assisting message on the help screen in accordance with the associations, if the operator selects one of the inquiring messages.

2. A method of displaying support information according to claim 1, wherein one or more assisting messages are not displayed on the help screen, if the one or more assisting messages are determined to be unnecessary for the operator by a detected internal condition.

3. A method of displaying support information according to claim 1, further comprising:
   providing operation switches operable by the operator to adjust the at least one of the detected internal conditions of the image display device; and
   displaying a value identifying the at least one of the detected internal conditions with the assisting message on the help screen.

4. A method of displaying support information according to claim 1, further comprising:
   providing a signal input terminal on the image display device, the signal input terminal configured to receive a plurality of types of signal; and
   detecting a signal mode identifying what type of signal is received,
   each of the associations being defined by the signal mode.

5. A method of displaying support information according to claim 1, wherein the assisting messages contain information regarding events that will occur for an object to be adjusted.

6. An image display device capable of displaying support information which enables an operator to adjust settings of an image display device or to solve a problem occurring in the image display device, the image display device comprising:
   a detecting unit that detects, with a central processing unit, internal conditions of the image display device;
   a storage device that stores inquiring messages based on the detected internal conditions identifying problems occurring in the image display device and assisting messages each showing information for assisting an operator to solve a respective one of the identified problems;

a table that associates the inquiring messages with the assisting messages, each of the associations in the table being defined by one of the detected internal conditions; and an adjusting operation support device that displays the inquiring messages on a help screen such that an operator can select one of the inquiring messages, and displays at least one assisting message in accordance with the associations, if the operator selects one of the inquiring messages.

7. An image display device according to claim 6, wherein one or more assisting messages are not displayed on the help screen, if the one or more assisting messages are determined to be unnecessary for the operator by a detected internal condition.

8. An image display device according to claim 6, further comprising:

operation switches operable by the operator to adjust the one of the detected internal conditions of the image display device, wherein the adjusting operation support device displays a value identifying the one of the detected internal conditions with the assisting message on the help screen.

9. An image display device according to claim 6, further comprising:

a signal input unit that is configured to receive a plurality of types of signal, wherein the detecting unit detects a signal mode identifying what type of signal is received by the signal input unit, and each of the associations is defined by the signal mode.

10. An image display device according to claim 6, wherein the assisting messages contain information regarding events that will occur for an object to be adjusted.

\* \* \* \* \*